United States Patent
Joos

(10) Patent No.: US 7,280,375 B2
(45) Date of Patent: Oct. 9, 2007

(54) CIRCUIT ARRANGEMENT FOR OPERATING AT LEAST ONE LIGHT-EMITTING DIODE

(75) Inventor: Ulrich Joos, Nonnenhorn (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 251 days.

(21) Appl. No.: 10/532,544

(22) PCT Filed: Oct. 8, 2003

(86) PCT No.: PCT/DE03/03325

§ 371 (c)(1),
(2), (4) Date: Apr. 22, 2005

(87) PCT Pub. No.: WO2004/045250

PCT Pub. Date: May 27, 2004

(65) Prior Publication Data

US 2005/0269956 A1    Dec. 8, 2005

(30) Foreign Application Priority Data

Nov. 11, 2002  (DE) ............................... 102 52 624

(51) Int. Cl.
*H02M 3/335*  (2006.01)
(52) U.S. Cl. .................. 363/17; 363/89; 363/21.1; 363/63; 363/98; 363/108; 315/291; 315/209 R; 315/200 R; 362/227; 362/265; 362/800
(58) Field of Classification Search ............. 363/21.04, 363/21.1, 21.18, 24–26, 31, 16, 17, 89, 63, 363/56.02, 56.01, 98, 108, 109; 362/227, 362/800, 265; 315/291, 209 R, 200 R, 224, 315/216, 226, 77, 82
See application file for complete search history.

(56) References Cited

U.S. PATENT DOCUMENTS

| | | | |
|---|---|---|---|
| 5,661,645 A  * | 8/1997 | Hochstein | 363/89 |
| 6,411,045 B1 * | 6/2002 | Nerone | 315/291 |
| 6,826,059 B2 | 11/2004 | Boeckle et al. | 363/17 |
| 6,858,994 B2 * | 2/2005 | Vollrath | 315/200 A |
| 7,025,473 B2 * | 4/2006 | Dokoupil | 362/640 |
| 7,195,381 B2 * | 3/2007 | Lynam et al. | 362/494 |
| 2002/0075677 A1 | 6/2002 | Dokoupil | 362/226 |

FOREIGN PATENT DOCUMENTS

| | | |
|---|---|---|
| DE | 2304620 | 8/1974 |
| DE | 41 41 059 A1 | 6/1993 |
| DE | 200 02 482 U1 | 5/2000 |
| DE | 100 13 207 A1 | 9/2001 |
| DE | 100 54 212 | 5/2002 |
| JP | 08-137429 A | 5/1996 |

* cited by examiner

*Primary Examiner*—Haissa Philogene
(74) *Attorney, Agent, or Firm*—W. F. Fasse; W. G. Fasse

(57) ABSTRACT

A circuit arrangement is for operating at least one light-emitting diode LED in an electrical circuit at a service voltage greater than the forward voltage of the at least one light-emitting diode. The light-emitting diode is PWM-controlled. The circuit includes reactances that are connected in series at both connections of the light-emitting diode, an additional switching arrangement between the terminals, and a full-wave rectifier circuit, such that the circuit is protected against short-circuits on the service voltage and on ground while the LED can continue to be triggered.

6 Claims, 2 Drawing Sheets

CIRCUIT ARRANGEMENT FOR OPERATING AT LEAST ONE LIGHT-EMITTING DIODE

FIELD OF THE INVENTION

The invention relates to a circuit arrangement for operating at least one light-emitting diode.

BACKGROUND INFORMATION

Light-emitting diodes have typical forward voltages of 1.5 to 3.5 Volt. For being able to operate light-emitting diodes in electrical circuits with a greater service voltage, the light-emitting diodes must be protected against too high flowing currents. This protection can be performed in easy manner by semi-conductor components or resistances connected in series, which, however, may result in high power losses. Without high power losses, light-emitting diodes can be operated in electrical circuits with greater service voltages, by clocked inductances limiting the diode current. Clocked inductances of this type, however, require high circuit complexity and, therefore, are a complex and costly alternative.

For supplying the light-emitting diode with a corresponding service voltage, use of a PWM-control is known, as a rule with interposing smoothing elements, such as capacitors, as is outlined in FIG. 1 and is known, for example, from DE 100 13 207 or DE 41 41 059.

A number of circuit arrangements are known for operation with a 230 volt a.c. voltage, in which each light-emitting diode is respectively supplied with the correct phase via a full-wave rectifier circuit (see DE 23 04 620, JP 08137429, DE 200 02 482 U1, DE 100 54 212 A1).

SUMMARY OF THE INVENTION

As, however, in particular for use in automotive supply systems, short-circuits cannot be excluded, a circuit arrangement for operating at least one light-emitting diode according to the general state of the art shall be further developed to enable the reliable and durable operation of the light-emitting diode also with short-circuits and to be able to be manufactured at low costs.

The object is achieved in accordance with the invention as disclosed herein.

The full-wave rectifier circuit at the output of the LED driver circuit and the symmetrical construction of the reactances combined with the additional switching means enable operation also for the case of a short-circuit at the LED single-ended or with service voltage.

For level adaptation, the pulse-width modulated signal is connected to the basis of a level transistor of the circuit arrangement, of which the collector is connected to ground and its emitter is connected to the service voltage as well as to the bases of a first White's emitter follower for the purpose of current amplification. The first White's emitter follower is substantially composed of a first NPN transistor and a first PNP transistor, the emitter of the first NPN transistor being connected to the emitter of the first PNP transistor and to the first resistance. Moreover, the collector of the first NPN transistor is connected to the service voltage of the circuit arrangement. The collector of the first PNP transistor is connected to the ground of the electrical circuit. Together with the first capacitance the first resistance forms the reactance limiting the current flow through the light-emitting diode.

Between the first capacitance and the at least one light-emitting diode a protective circuit is formed, which blocks a current flow to the ground.

In an advantageous further development of the invention it is provided that for limiting the rise times of the signal modulated in pulse-width and amplified in current a second White's emitter follower from a second NPN transistor and a second PNP transistor is connected between the first resistance and via a second resistance to the emitter of the first White's emitter follower. In this connection between the second resistance and the bases of the second White's emitter follower a second capacitor is connected to ground.

In the next further development of the invention it is provided that the level transistor and/or the first NPN transistor and/or the first PNP transistor and/or the second NPN transistor and/or the second PNP transistor are embodied as metal-oxide field-effect transistors FET.

Operation and triggering of the at least one light-emitting diode by means of pulse-width modulation is possible in accordance with the invention with balanced as well as asymmetrical electrical circuits. With an asymmetrically designed circuit arrangement the ground lies at zero volt. With a symmetrically designed circuit arrangement the ground comprises the negative value of the service voltage.

By means of the circuit arrangement designed in this way operation of the at least one light-emitting diode is possible in electrical circuits with substantially greater service voltages without the at least one light-emitting diode being degraded. In this way, the circuit arrangement can be manufactured at low cost.

BRIEF DESCRIPTION OF THE DRAWINGS

In the following the circuit arrangement according to the invention for operating the at least one light-emitting diode shall be described on the basis of an example of embodiment taken in conjunction with two drawings.

DETAILED DESCRIPTION OF AN EXAMPLE EMBODIMENT OF THE INVENTION

Modern vehicles comprise a service voltage of 12 to 42 volt. For example, with switches or displays advantageously one or two light-emitting diodes are used as a luminous means, which have a forward voltage of about 2.5 volt. To enable operation of the light-emitting diodes in electric currents of e.g. 42 volt, circuit arrangements are used, in which the current for the light-emitting diode is limited by a reactance, which is formed by a resistance and a capacitor.

Figure 1:
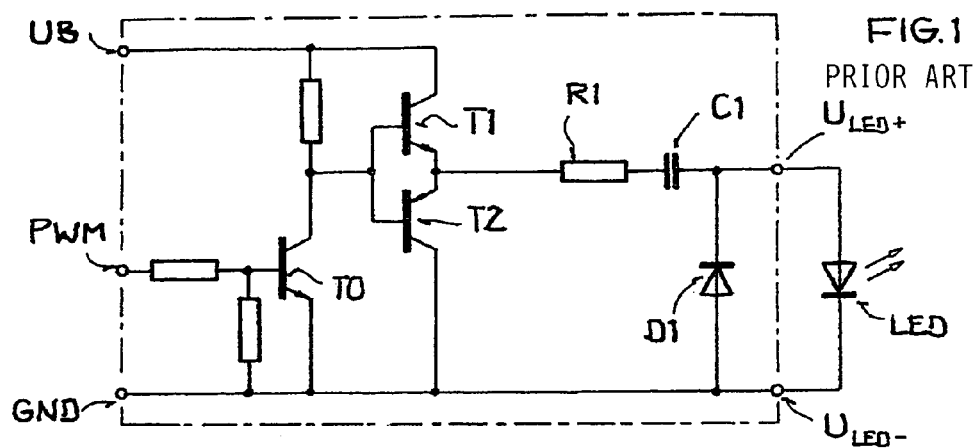
FIG. 1 shows a view of the circuit arrangement of level adaptation, current amplifier, reactance and a protective circuit according to the state of art formed as a protective diode.

In FIG. 1 a simply formed circuit arrangement of this type according to the state of art is shown for one single light-emitting diode LED. Adjustment of the current flowing through the light-emitting diode LED is performed by means of pulse-width modulation. For level adjustment the pulse-width modulated signal PWM is connected to the basis of a level transistor T0, of which the collector is connected to the ground GND and its emitter to the service voltage UB as well as with the bases of the first White's emitter follower. The first White's emitter follower serves for current amplification and for impedance conversion, resp., and is substantially composed of a first NPN transistor T1 and a first PNP transistor T2. The emitter of the first NPN transistor T1 is connected to the emitter of the first PNP transistor T2 and to the first resistance R1. Moreover, the collector of the first NPN transistor T1 is connected to the service voltage UB of the circuit arrangement. The collector of the first PNP transistor T2 is connected to the ground GND. Together with the first capacitance C1 the first resistance R1 forms the reactance limiting the current flow through the light-emitting diode LED. As a protective circuit a protective diode D1 is formed between the first capacitance C1 and the light-emitting diode LED, which protective diode D1 blocks the current flow to the ground GND.

Figure 2:
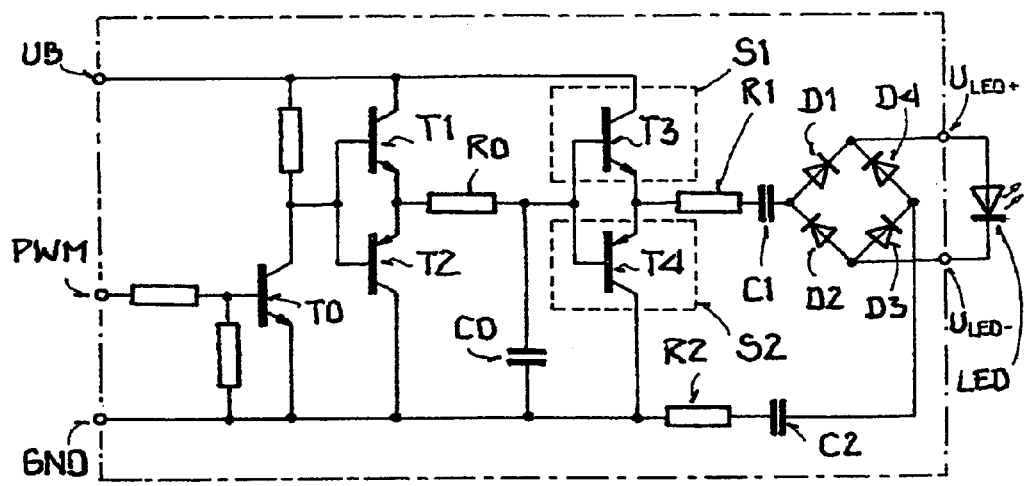
FIG. 2 shows a view of the circuit arrangement of level adaptation, current amplifier, reactance, a circuit for limiting the rise times of the pulse-width modulated signal and a protective circuit formed as a full-wave rectifier circuit.

In FIG. 2 a protective circuit according to the invention is shown, which also comprises the level transistor T0 for level adaptation and the first White's emitter follower for current amplification and impedance conversion, resp. Additionally, for limiting the rise times of the pulse-width modulated signal PWM a second White's emitter follower from a second NPN transistor T3 and a second PNP transistor T4 is connected between the first resistance R1 and via a second resistance R0 to the emitter of the first White's emitter follower. In this connection, between the third resistance R0 and the bases of the second White's emitter follower a third capacitor C0 is connected to the ground GND. Metal-oxide field-effect transistors are used as transistors for the first and the second White's emitter follower.

As a full-wave rectifier circuit the protective circuit is formed of a first diode D1 the second diode D2, the third diode D3 and the fourth diode D4. Here, the first diode D1 is connected in forward direction to the positive terminal $U_{LED+}$ of the light-emitting diode LED and to the second diode D2. The second diode D2 is connected in the inverse direction to the ground GND and to the third diode D3. The third diode D3 is connected in the inverse direction to the negative terminal $U_{LED-}$ of the light-emitting diode LED and to the fourth diode D4. The fourth diode D4 is connected in forward direction to the first diode D1 and to the first capacitor C1. In this connection between the full-wave rectifier circuit and the connection to ground of the collector of the second PNP transistor T4 of the second White's emitter follower a further reactance of the second resistance R2 and the second capacitor C2 is arranged.

Basically, the circuit can also be composed of other switching means, such as e.g. all-field-effect transistors or the like.

The circuit arrangements shown in FIGS. 1 and 2 are designed asymmetrically, the service voltage UB being 42 volt and the ground GND comprising a voltage of zero volt. The circuit arrangements could also be designed symmetrically, the two connections switching in anti-phase between the service voltage UB and the ground GND. By this arrangement the current in the light-emitting diode LED can be kept constant over a greater service voltage range.

By the circuit arrangement embodied this way, operation of the light-emitting diode LED is possible with the substantially greater service voltages UB, e.g. of 42 volt, without the light-emitting diode LED being degraded.

Figure 3:
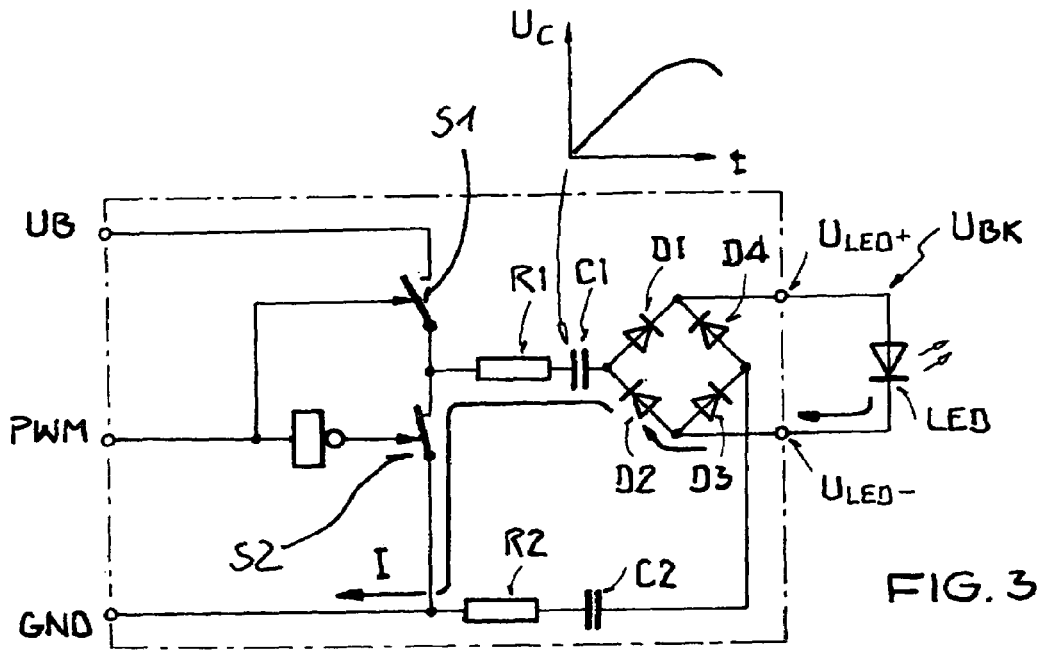
FIG. 3 shows a general operating principle in case of a short-circuit.

The short-circuit strength of the circuit is to be explained in short on the basis of the following FIG. 3.

If a short-circuit is considered at the positive terminal $U_{LED+}$ of the light-emitting diode LED towards the service voltage UB, as is outlined in FIG. 3, the second reactance C2/R2 is charged at first directly via the diode D3 to the service voltage and the diode D3 subsequently blocks this branch. Triggering is now performed merely via the first reactance C1, R1, which with an open upper switching means S1 and a closed switching means S2 charges from the short-circuit of the positive terminal of the LED via the diode D2 towards ground, the course of the charging current 1 being drafted in FIG. 3.

Figure 4:
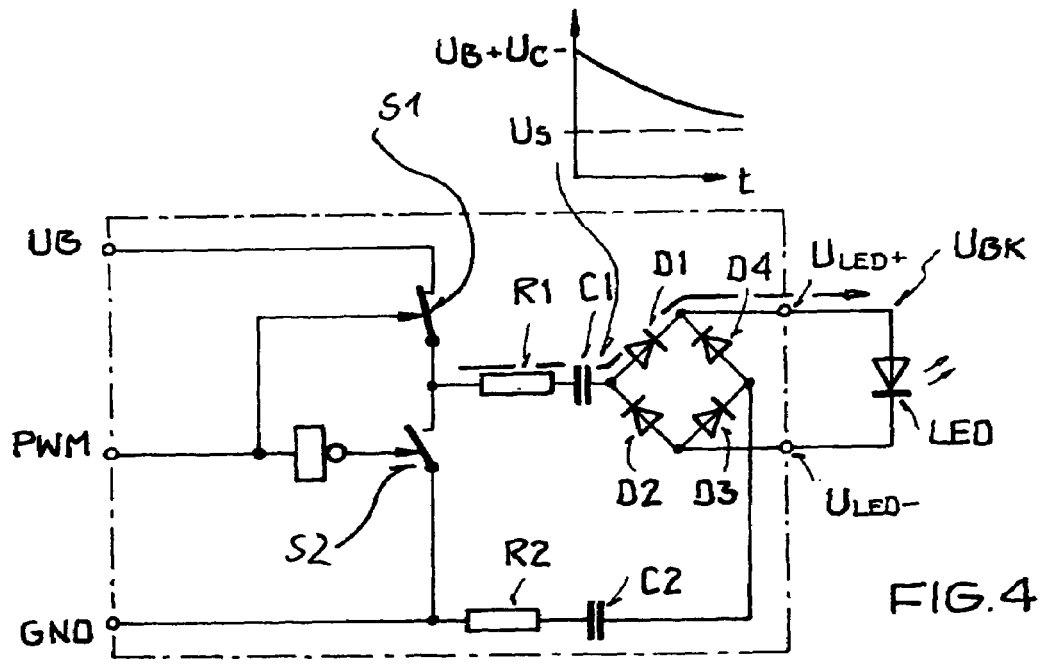
FIG. 4 shows the circuit of FIG. 3 in a subsequent switching cycle.

If in the next cycle the switching means S2 is opened and S1 is closed, based on the charged C1, as is drafted in FIG. 4, a voltage (UB+Uc) appears at the anode of D1 above the service voltage, as the service voltage UB and the charge stored in the capacitor C1 superimpose. By means of this the diode D1 becomes conductive and C1 can discharge in the short-circuit. Due to this discharge, C1 can recharge with the re-closing of S2 and with an opened S1.

As the clock frequency of the PWM as a rule is chosen to be beyond the frequency region recognizable by the human eye, the phases of extinguishing of the LED are virtually not distinguishable.

If the short-circuit is considered at service voltage at the negative terminal $U_{LED-}$ of the LED, C2 in turn is charged to UB and blocks subsequently. If S2 is closed, C1 can charge from the short-circuit via D2 towards ground and releases this charge back to the short-circuit after opening of S2 and closing of S1 via D1 and the LED.

A short-circuit on ground at the negative terminal $U_{LED}$ of the LED results in that in both operating phases the current flows via C1 and D1 and in that D3 is blocked.

A short-circuit on ground at the positive terminal results with a closed S1 in charging of C1 via D1 towards the short-circuit ground. Now, if S1 is opened and S2 is closed, this results in a current flow from the negative terminal of C1 via D2 and the LED into the ground short-circuit.

The invention claimed is:

1. A circuit arrangement for operating at least one light-emitting diode (LED) in an electrical circuit at a service voltage (UB), which is greater than the forward voltage of the at least one light-emitting diode (LED) which is to be operated,
   wherein adjustment of a current flowing through the light-emitting diode (LED) is performed by means of pulse-width modulation of a first switching means (S1), which is switched between a first terminal of the service voltage (UB) and the light-emitting diode LED,
   wherein between the first terminal of the service voltage (UB) and the at least one light-emitting diode (LED) a first reactance formed by a first resistance (R1) and a first capacitor (C1) is arranged,
characterized in that
   the at least one light-emitting diode (LED) is connected via a second reactance formed by a second resistance (R2) and a second capacitor (C2) to a second terminal of the service voltage,
   between the two connections of the at least one light-emitting diode (LED) and the two reactances (R1-C1, R2-C2) a full-wave rectifier diode bridge of four diodes (D1, D2, D3, D4) being switched, and
   at a tap between the first switching means (S1) and the at least one light-emitting diode (LED) a connection, switchable via a second switching means (S2), to the second terminal of the service voltage exists, the second switching means (S2) being operated in push-pull action to the first switching means (S1).

2. A circuit arrangement according to claim 1, characterized in that the service voltage is a d.c. voltage and in that the service voltage is applied at the first terminal and a ground potential is applied at the second terminal and in that the full-wave rectifier circuit is formed of four diodes (D1, D2, D3, D4), the diodes being interconnected as follows:

the first diode (D1) is polarized in forward direction and is switched between the first reactance (R1-C1) and the positive terminal ($U_{LED+}$) of the light-emitting diode (LED), the second diode (D2) is polarized in the inverse direction and is switched between the first reactance (R1-C1) and the negative terminal ($U_{LED-}$) of the light-emitting diode (LED), the third diode (D3) is polarized in forward direction and is switched between the second reactance (R2-C2) and the negative terminal ($U_{LED-}$) of the light-emitting diode (LED), the fourth diode (D4) is polarized in the inverse direction and is switched between the second reactance (R2-C2) and the positive terminal ($U_{LED+}$) of the light-emitting diode (LED).

3. A circuit arrangement according to claim 2, characterized in that for level adaptation, the pulse-width modulated signal (PWM) is connected to the base of a level transistor (T0) of the circuit arrangement, of which the collector is connected to the ground (GND) and its emitter is connected to the service voltage (UB) as well as to the bases of a first White's emitter follower for the purpose of current amplification, which first White's emitter follower is substantially composed of a first NPN transistor (T1) and a first PNP transistor (T2), the emitter of the NPN transistor (T1) being connected to the emitter of the PNP transistor (T2) and to the first resistance (R1), and the collector of the NPN transistor (T1) being connected to the service voltage (UB), and the collector of the PNP transistor (T2) being connected to the ground (GND).

4. A circuit arrangement according to claim 3, characterized in that for limiting a rise time of the signal (PWM) modulated in pulse-width, and amplified in current, a second White's emitter follower from a second NPN transistor (T3) and a second PNP transistor (T4) is connected between the first resistance (R1) and via a further resistance (R0) to the emitter of the first White's emitter follower, between the further resistance (R0) and the bases of the second White's emitter follower a second capacitor (C0) being connected to the ground (GND).

5. A circuit arrangement according to claim 3, characterized in that at least one of the transistors is embodied as a metal-oxide field-effect transistor.

6. A circuit arrangement according to claim 4, characterized in that the level transistor (T0) and/or the first NPN transistor (T1) and/or the first PNP transistor (T2) and/or the second NPN transistor (T3) and/or the second PNP transistor (T4) are embodied as metal-oxide field-effect transistors.

* * * * *